United States Patent [19]
Libengood

[11] Patent Number: 5,971,321
[45] Date of Patent: Oct. 26, 1999

[54] BODY LIFT AIRPLANE ASSEMBLY

[76] Inventor: Ronald L. Libengood, 73 Doris Dr., Security, Colo. 80911

[21] Appl. No.: 08/971,301

[22] Filed: Nov. 17, 1997

[51] Int. Cl.$^6$ .................................................. B64C 1/00
[52] U.S. Cl. ...................... 244/36; 244/23 R; 244/23 B; 244/23 C
[58] Field of Search ............................... 244/23 B, 23 C, 244/23 R, 36, 45 A

[56] References Cited

U.S. PATENT DOCUMENTS

| | | | |
|---|---|---|---|
| 2,060,469 | 11/1936 | Noble | 244/5 |
| 3,132,825 | 5/1964 | Postle et al. | 244/36 |
| 3,519,244 | 7/1970 | Boyd et al. | 244/23 C |
| 4,050,652 | 9/1977 | DeToia | 244/23 C |
| 4,757,962 | 7/1988 | Grant | 244/23 B |
| 5,351,911 | 10/1994 | Neumayr | 244/23 C |
| 5,836,542 | 11/1998 | Burns | 244/23 C |

*Primary Examiner*—Charles T. Jordan
*Assistant Examiner*—Charles R. Ducker, Jr.
*Attorney, Agent, or Firm*—Phillip A. Rein

[57] ABSTRACT

A body lift airplane assembly including 1) a main air lift body assembly of substantial length and width; 2) a landing gear/wheel assembly retractably connected to the main air lift body assembly; 3) a fixed wing assembly secured to and extended above the main air lift body assembly and having a fixed wing member of a length equal to the width of the main air lift body assembly; 4) an engine propulsion power assembly having a pair of spaced jet engine pod assemblies mounted within engine cut-out portions in outer edges of the main air lift body assembly; and 5) a fin and rudder assembly of a V-shape connected to a central rear portion of the main air lift body assembly. The main air lift body assembly includes a main body assembly having outer peripheral side and rear edges formed with downwardly extended arcuate air lift portions to provide air lift characteristics to the overall main air lift body assembly. The main air lift body assembly is provided with a passenger compartment section and a pilot control section and access thereto through an access escalator assembly and not dependent on external airport facility structures for loading and unloading. The jet engine pod assemblies each are operable to receive air flow from both above and below the main body assembly of the main air lift body assembly to increase the fuel combustion efficiency.

8 Claims, 2 Drawing Sheets

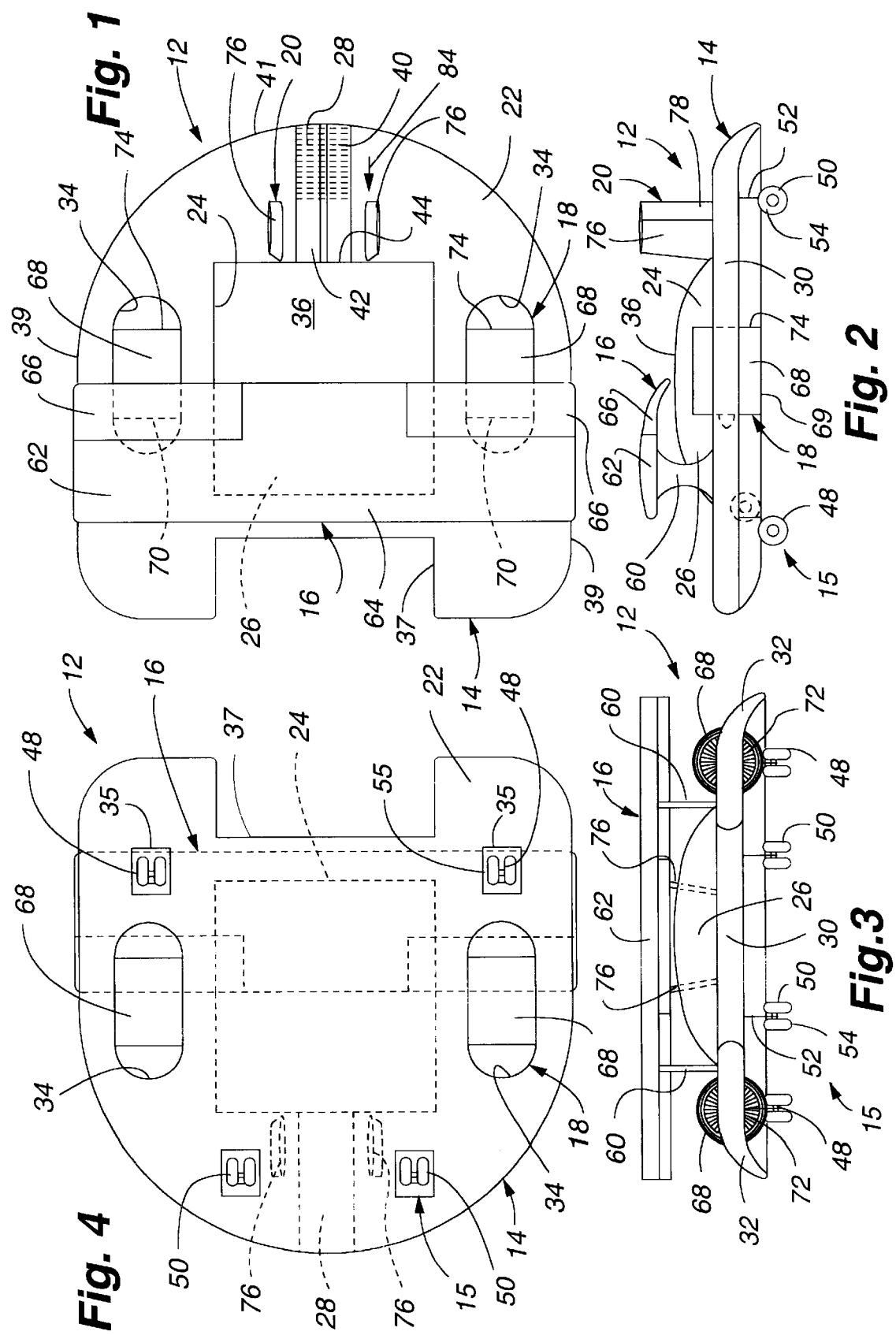

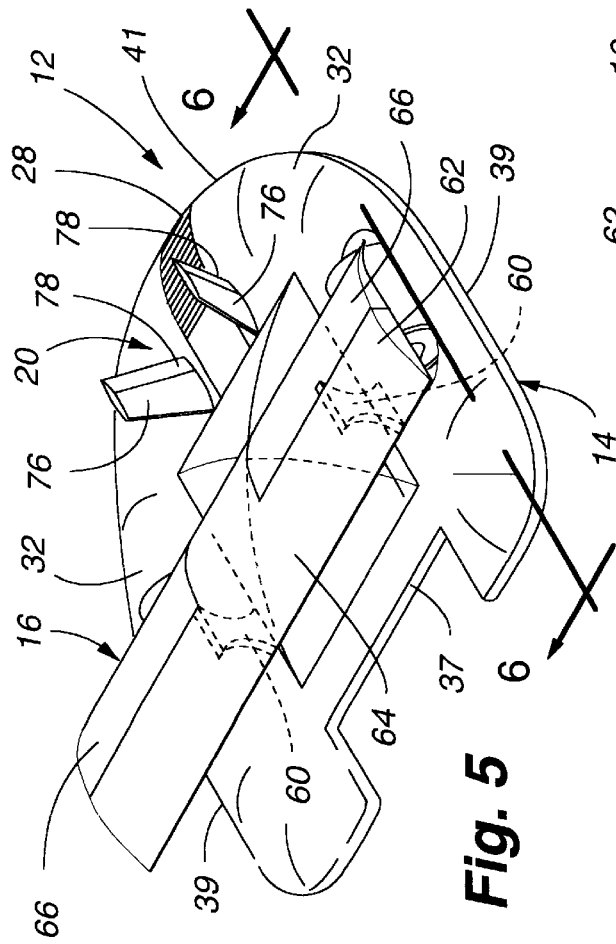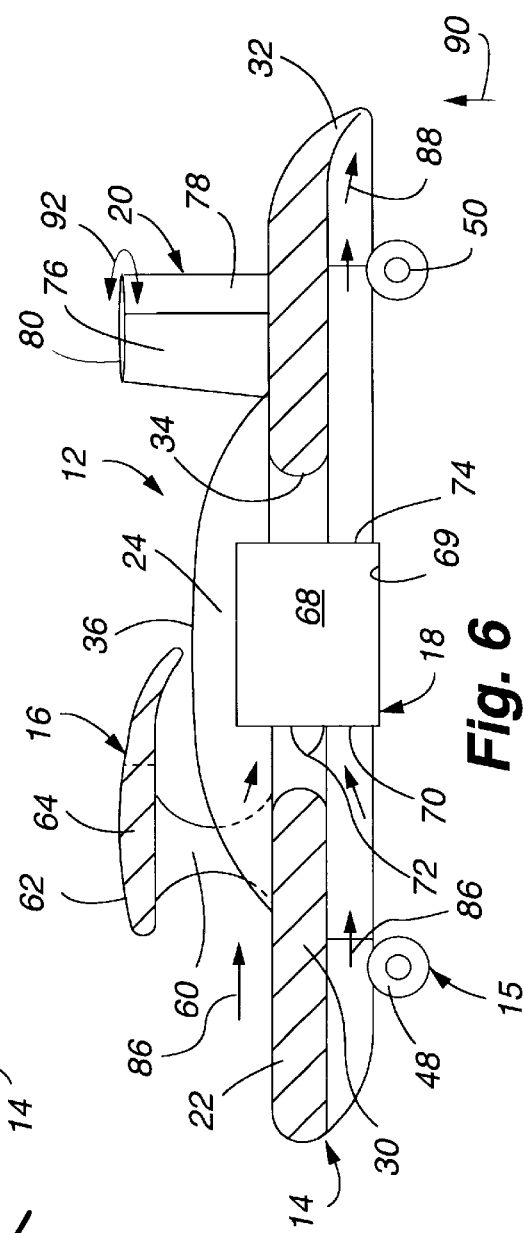

BODY LIFT AIRPLANE ASSEMBLY

PRIOR ART

A patent search was not conducted on this invention.

PREFERRED EMBODIMENT OF THE INVENTION

In one preferred embodiment of this invention, a body lift airplane assembly is provided including modernistic design and efficient flight characteristics and having a main engine passenger body assembly operable similar to a conventional airplane wing assembly to provide increased lift forces to achieve an efficient method of flight.

The body lift airplane assembly includes 1) a main air lift body assembly; 2) a landing gear/wheel assembly connected to the main air lift body assembly for normal flight landing operations; 3) a fixed wing assembly connected to and placed above the main air lift body assembly; 4) an engine propulsion power assembly connected to the main air lift body assembly; and 5) a fin and rudder assembly connected to a rear portion of the main air lift body assembly to provide controlled flight as will be explained.

The main air lift body assembly includes 1) a main body assembly; 2) a passenger compartment section; 3) a pilot control section connected to the passenger compartment section; and 4) an access escalator assembly providing means for entrance and exit into the main body assembly.

In a top plan view, the main body assembly is of generally C-shape having a support section provided with an arcuate air lift portion, engine cut-out portions, wheel receiver areas, and a forward cut-out portion.

The arcuate air lift portion is of an arcuate, downwardly extended shape from a main support body and is operable similar to a conventional airplane wing assembly to provide air lift features similar to an airfoil structure. The arcuate air lift portion extends downwardly from spaced side walls and a semi-circular rear wall of the main body assembly.

The passenger compartment section is a large auditorium dome structure including rows of seats for a plurality of airline passengers, such as 150 passenger members, and having a domed cover member. The domed cover member is constructed of an opaque type material allowing limited sunlight therethrough and will be light colored at night similar to material used in sunglasses which turn from a clear to a dark color depending on the amount of light present.

The pilot control section is mounted in an area forward of the passenger compartment section and having an airplane control and instrument panel therein in close proximity to an airplane pilot, a co-pilot, and a flight engineer personnel therein.

The airplane control and instrument panel is used in a conventional manner by the airline personnel in order to take off, control, and land the body lift airplane assembly during flight conditions in a conventional manner.

The access escalator assembly is mounted on a rear upper portion of the main body assembly and provided with 1) a moving step assembly similar to a normal escalator folding step means; 2) an escalator cover assembly which is selectively slidable to reveal the moving step assembly during passenger loading of the airplane assembly and enclose the moving step assembly during flight conditions; and 3) an entrance door member mounted at a rear portion of the passenger compartment section to selectively allow entrance and departure from the moving step assembly.

The land gear/wheel assembly includes 1) a pair of forward gear wheel assemblies; and 2) a pair of rearward gear wheel assemblies. Each of the forward and rearward gear wheel assemblies are provided with 1) landing gear struts having one end pivotally connected within a bottom surface of the main body assembly of the main air lift body assembly; and 2) a landing wheel assembly connected to respective outer ends of a landing gear strut. Each of the forward and rearward gear assemblies are enclosed by respective enclosure panels when in retracted positions.

Each landing gear/wheel assembly is operable to be extended during a landing operation and retracting after the main lift airplane assembly is airborne in a conventional manner. Operation of the landing gear/wheel assemblies is controlled by the airline personnel, namely the pilot and/or co-pilot, in a conventional manner through use of the airplane control and instrument panel and respective take-off and landing control members thereon.

The fixed wing assembly includes a pair of wing support struts having lower ends thereof secured to the main body assembly and having upper ends thereof secured to a fixed wing member.

The fixed wing member includes an elongated main wing body having a longitudinal axis extended and equal in length to the width of the support section of the main body assembly of the main air lift body assembly and having connected thereto a pair of spaced pivotal flap members.

The pivotal flap members are pivotal about respective, aligned pivot axes parallel with the longitudinal axis of the main wing body and operable to be conjointly raised and/or lowered. The alternately pivotal movement between these upper and lower positions during a flight control process results in movement of the entire body lift airplane assembly for right and left turning and up and down flight operations in a conventional manner.

The engine propulsion power assembly includes a pair of spaced jet engine pod assemblies, each selectively mountable within respective ones of the engine cut-out portions of the support section of the main body assembly. Each jet engine pod assembly is provided with a main engine housing having 1) an inlet air section; 2) rotatable inlet fan members; and 3) an engine discharge section. Inlet combustion air into the inlet air section is provided from air flow over and under adjacent portions of the support section of the main body assembly for increased fuel efficiency as will be explained.

Each jet engine pod assembly is operable in a conventional manner to receive inlet air into the inlet air section which is mixed with combustible jet fuel to rotate the inlet fan members and provide jet propulsion exhaust through the engine discharge section and being operable in a substantially conventional manner. However, a new and novel provision for inlet air into the inlet air section is provided as will be explained.

The fin and rudder assembly is provided with a pair of inclined fin members which, together, form a generally V-shape therebetween. Each inclined fin member is provided with a pivotal rudder member and an upper top section.

Each pivotal rudder member is selectively pivoted about a respective inclined axis in order to control turning movement of the body lift airplane assembly during flight in a known conventional manner.

The top section extends upwardly to a height substantially equal to a height of an upper surface of the main wing body of the fixed wing member of the fixed wing assembly. This provides maximum control during movement of the pivotal rudder members during an airplane control operation initiated through the airplane control and instrument panel being controlled by the airplane flight personnel, namely the airplane pilot and/or co-pilot.

OBJECTS OF THE INVENTION

One object of this invention is to provide a body lift airplane assembly having a main air lift body assembly of a substantial length and width being approximately equal to each other and being of an oval shape having an outer peripheral arcuate air lift portion so that the main air lift body assembly acts as an airfoil in conjunction with a fixed wing assembly to provide new, novel, and unique lift features for increased flight stability and fuel efficiency.

Another object of this invention is to provide a body lift airplane assembly including 1) a main air lift body assembly; 2) a fixed wing assembly secured to and extended above the main air lift body assembly; and 3) an engine propulsion power assembly mounted within the main air lift body assembly and a longitudinal length of a fixed wing member of the fixed wing assembly is substantially equal to a width of the main air lift body assembly and increased air flow about the main air lift body assembly operates to provide inlet air to the engine propulsion power assembly and substantial lift features acting as an airfoil for a more efficient flight operation.

One other object of this invention is to provide a body lift airplane assembly including a main air lift body assembly with 1) a support section provided with a peripheral arcuate air lift portion; 2) a passenger compartment section having a domed cover and having passenger seats therein to carry 150 passengers or more; and 3) a pilot control section to be occupied by airline personnel for normal flight control operations.

A further object of this invention is to provide a body lift airplane assembly including a main air lift body member with a large passenger compartment section to be accessed through an access escalator assembly having a moving step assembly which provides independent means of loading and unloading airline personnel and passenger members thereto, thus being completely self-supporting when landing on an airfield runway.

One further object of this invention is to provide a body lift airplane assembly including 1) a main air lift body assembly; 2) a landing gear/wheel assembly connected to the main air lift body assembly; 3) a fixed wing assembly having a fixed wing member connected to the main air lift body assembly and extended upwardly therefrom; 4) an engine propulsion power assembly connected to the main air lift body assembly; and 5) a fin and rudder assembly connected to a central rear portion of the main air lift body assembly and having inclined fin members angled outwardly relative to each other and the body lift airplane assembly is of generally oval shape of a width and length substantially equal to a longitudinal axis of the fixed wing member to provide for efficient flight operations providing a maximum amount of lift from both the main air lift body assembly and the fixed wing member.

Another object of this invention is to provide a body lift airplane assembly including a main body assembly operable to provide inlet air flow over upper and lower surfaces into engine propulsion power assemblies to provide efficient operation of jet fuel propulsion engines used thereon.

Still, one other object of this invention is to provide a body lift airplane assembly which is economical to manufacture; operable to obtain maximum air lift characteristics through use of a main body assembly and a fixed wing assembly; easily controlled by airline personnel during flight operations; efficient in flight and saves fuel; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a top plan view of the body lift airplane assembly of this invention;

FIG. 2 is a side elevational view thereof;

FIG. 3 is a front elevational view thereof;

FIG. 4 is a bottom plan view thereof;

FIG. 5 is a perspective view thereof; and

FIG. 6 is an enlarged sectional view taken along line 6—6 in FIG. 5.

The following is a discussion and description of preferred specific embodiments of the body lift airplane assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a body lift airplane assembly of this invention, indicated generally at 12, is of a modernistic design utilizing new air lift features on a main body assembly 22 to provide more efficient flight characteristics with increased speeds and fuel efficiency. The main body assembly 22 resembles a flying disc with a wing assembly and a rudder assembly connected thereto to achieve controlled flight as will be explained.

The body lift airplane assembly 12 includes 1) a main air lift body assembly 14; 2) a landing gear/wheel assembly 15 pivotally and retractably connected to the main air lift body assembly 14; 3) a fixed wing assembly 16 secured to and positioned upwardly in an elevational position above the main air lift body assembly 14; 4) an engine propulsion power assembly 18 having a pair of jet engine pod assemblies 68 connected to the main air lift body assembly 14; and 5) a fin and rudder assembly 20 connected to a rear portion of the main air lift body assembly 14 to provide flight air control features.

The main air lift body assembly 14 includes 1) the main body assembly 22 of a generally oval C-shape; 2) a passenger compartment section 24 mounted in a central portion of the main body assembly 22; 3) a pilot control section 26 mounted adjacent and forwardly of the passenger compartment section 24, both of which are mounted within the main body assembly 22; and 4) an access escalator assembly 28 secured to a rear portion of the passenger compartment section 24 to selectively allow passenger members and flight personnel to enter and exit the passenger compartment section 24.

The main body assembly 22 includes a support section 30 having 1) an arcuate air lift portion 32 about an outer peripheral edge thereof; 2) a pair of spaced engine cut-out portions 34; 3) a plurality of spaced wheel receiver areas 35; and a forward cut-out portion 37.

The arcuate air lift portion 32 is of a downwardly curved shape as best noted in FIGS. 2 and 3 extended about the outer periphery of the support section 30 except for forward edges thereof More particularly, the arcuate air lift portion 32 extends about spaced parallel side walls 39 and a semicircular curved rear wall 41.

The passenger compartment section 24 is of a large auditorium size with numerous rows of passenger seat members and covered by a domed cover member 36. The passenger seat members have aisles therebetween and are provided with television and video movie features to provide for the normal comfort and entertainment of the passenger members as found on modern airline airplanes.

The domed cover member 36 is constructed of a known material which darkens during sunlight conditions and become clear under darkened conditions for the enjoyment and comfort of the passenger members within the support section 30 of the main body assembly 22.

The pilot control section 26 is of a conventional nature having an enclosed, private area therein for the airplane control personnel, namely the pilot, co-pilot, and engineer, and having an airplane control and instrument panel (not shown).

As best shown in FIG. 1, the access escalator assembly 28 includes 1) a moving step assembly 40 having exposed and collapsible step members of a conventional nature; 2) an escalator cover assembly 42 to selectively reveal and enclose the moving step assembly 40; and 3) an entrance door member 44 positioned at an upper end of the moving step assembly 40 to provide ingress and egress into the passenger compartment section 24.

The moving step assembly 40 is operable to be reciprocally mounted about end support members with endless step members to be exposed when moving upwardly into the passenger compartment section 24 for loading thereof or moving in an opposite direction to convey airline personnel and passenger members embarking from the passenger compartment section 24.

The escalator cover assembly 42 is operable to provide an enclosed air sealed cover to the moving step assembly 40 during flight conditions.

The access escalator assembly 28 provides a new and novel feature to the invention as not requiring a passenger disembarkment step assembly necessary for loading and unloading passenger members from the main air lift body assembly 14. Therefore, the body lift airplane assembly 12 can be utilized in any airstrip landing conditions as the personnel thereon can readily load and disembark therefrom without requiring external airport equipment to do so.

Further, the access elevator assembly 28 may be provided with an extension feature so that the moving step assembly 40 can be selectively extended downwardly from a lower surface of the main body assembly 22 to contact a ground support surface for ease of loading and unloading personnel thereon.

The landing gear/wheel assembly 15 is of a conventional nature having a pair of forward gear wheel assemblies 48 and a pair of rearward gear wheel assemblies 50.

Each forward and rearward gear wheel assembly 48, 50 is substantially identical, each having a pair of spaced landing gear struts 52 pivotally connected at an upper end to the main body assembly 22 and connected at respective outer ends to a landing wheel assembly 54.

Each forward and rearward gear wheel assembly 48, 50 is provided with an adjacent enclosure panel 55 so as to enclose respective ones thereof when in the fully retracted position folded within outer confines of the wheel receiver areas 35 of the support section 30 of the main body assembly 22 of the main air lift body assembly 14.

Each landing wheel assembly 54 is operable having pairs of wheel members thereon to provide necessary support when landing on a ground support surface on an airport runway.

Each of the forward gear wheel assemblies 48 are conjointly pivotal about a respective vertical axis during a landing procedure operation to control turning movement of the entire body lift airplane assembly 12 in a known conventional manner.

The fixed wing assembly 16 includes a pair of spaced wing support struts 60 having lower ends thereof secured to the main body assembly 22 through an upper surface thereof and upper ends of the respective wing support struts 60 are secured to spaced portions of a fixed wing member 62.

The fixed wing member 62 is provided with an elongated main wing body 64 having a pair of spaced pivotal flap members 66 connected thereto. The pivotal flap members 66 are each individually pivotal about an aligned axis extended parallel to a longitudinal axis of the fixed wing member 62.

As clearly shown in FIGS. 1, 3, and 4, a length of the fixed wing member 62 is substantially equal or slightly greater than a width of the main body assembly 22 of the main air lift body assembly 14. Therefore, both the main body assembly 22 and the fixed wing member 62 will provide beneficial air lift characteristics (similar to an airfoil) and control features plus provide inlet combustion air flow features to the engine propulsion power assembly 18 as will be explained.

The engine propulsion power assembly 18 includes a pair of spaced jet engine pod assemblies 68 with each one thereof respectively mounted in one of the engine cut-out portions 34 in the main body assembly 22 of the main air lift body assembly 14.

Each jet engine pod assembly 68 includes 1) an engine housing 69 having an air inlet section 70; 2) inlet fan members 72 mounted within the engine housing 69; and 3) an engine discharge section 74 through which exhaust gases and propulsion means are directed therefrom.

Each jet engine pod assembly 68 operates in a conventionally known manner to receive inlet air which is mixed with combustible jet fuel therein which is ignited and provides the power means for the entire body lift airplane assembly 12 in a known manner.

The use of the pair of spaced jet engine pod assemblies 60 which are balanced within the main air lift body assembly 14 to provides for controlled and fuel efficient jet propulsion means.

The fin and rudder assembly 20 includes a pair of inclined fin members 76 which conjointly are of a generally V-shape with an apex thereof below an upper surface of the main body assembly 22 as noted in FIG. 5. Each inclined fin member 76 has a pivotal rudder member 78 and a top section 80.

The pivotal rudder members 78 are each pivotal about a respective upwardly inclined axis to act on air passing thereby to provide for a turning control function as normally found on conventional tail members in prior art aircraft structures.

The top section 80 has an upper edge height substantially equal to that of an upper surface of the fixed wing member 62 to provide maximum control features through the pivotal rudder members 78.

USE AND OPERATION OF THE INVENTION

In the use and operation of the body lift airplane assembly 12 of this invention, we will first assume a parked or landed condition as noted in FIGS. 2 and 3 and positioned at an airport terminal gate area for the purpose of loading passenger members and flight personnel thereon in a first step in a flight operation procedure.

First, the access escalator assembly 28 is operable so as to reciprocate the moving step assembly 40 when the escalator cover assembly 42 is retracted. A plurality of top steps are exposed and movable upwardly as noted by an arrow 84 shown in FIG. 1. The moving top steps allow passenger members to be transported and conveyed upwardly on the reciprocating moving step assembly 40 through the entrance door member 44 so as to gain access and subsequent seating in the passenger compartment section 24.

Numerous of the passenger members, such as a number of 150 or greater, are allowed access into the passenger compartment section 24 to be serviced by airline flight attendants to receive their assigned seat member in preparation for eventual departure from the airport terminal.

Concurrently, additional flight control personnel, namely an airline pilot, co-pilot, and engineer, are allowed access on the moving step assembly 40 and the entrance door member 44 and operable to position themselves within the pilot control section 26 for access to the airplane control and instrument panel and other flight control elements therein. The flight control personnel prepare for starting and energization of the engine propulsion power assembly 18 for planned departure from the gate area of the airline terminal.

After the airline flight personnel and passenger members have been loaded into the passenger compartment section 24 and the pilot control section 26, authorization from a control tower is normally given whereupon the body lift airplane assembly 12 is allowed to leave the air terminal gate area and proceed outwardly to a terminal runway for a controlled flight departure therefrom.

The body lift airplane assembly 12 is thereupon allowed to enter the runway area under control tower supervision and energize the engine propulsion power assembly 18 to travel down the runway and obtain an airborne flight condition.

During the air flight conditions, it is noted that air will flow over upper and lower surfaces of the fixed wing member 62 to provide known flight lift characteristics as in airfoil due to curved portions of the fixed wing member 62. Direction and elevation of the body lift airplane assembly 12 is controlled by movement of the pivotal flap members 66 in a known flight procedure to provide controlled operations about horizontal and vertical axes in a known manner.

At this time it is noted that air flow, similar to that over upper and lower surfaces of the fixed wing member 62, will occur over upper and lower portions of the support section 30 of the main body assembly 22 in front of respective ones of the jet engine pod assemblies 68 as noted by arrows 86 in FIG. 6.

The air flow shown by the arrows 86 provide a vacuum air condition to provide positive air flow through the inlet fan members 72 and the inlet air section 70 of the respective jet engine pod assemblies 68 to achieve a more efficient mixture of air and jet fuel therein to increase combustion and fuel efficiency.

Further, the combination of burned jet fuel and exhaust gases emitting from the engine discharge section 74 as noted by the arrows 88, act on rearward portions of the arcuate air lift portion 32 of the main body assembly 22 which then increases an upward lift force as noted by arrow 90 in FIG. 6.

The existence of additional upward forces against the arcuate air lift portion 32 on the curved rear wall 41 operates to increase lift efficiency and allow the entire main body assembly 22 to act similar to an airplane wing assembly to provide for additional efficiency and fuel saving overall flight characteristics of the body lift airplane assembly 12 of this invention.

Also, during flight, the air flow rearwardly over the upper surface of the main body assembly 22 is engageable with the pivotal rudder members 78 of the fin and rudder assembly 20 so as to efficiently and effectively control turning movement of the overall body lift airplane assembly 12. This pivotal movement of the respective pivotal rudder members 78 is indicated by an arcuate arrow 92 in FIG. 6.

It is noted that the air flow between the fixed wing assembly 16 and an upper surface of the main body assembly 22 and the domed cover member 36 moves rearwardly to be acted upon by the respective pivotal rudder members 78 to add more efficiency in flight control operations.

On obtaining air flight characteristics at leaving the runway, it is obvious that the flight control personnel would activate the necessary control levers within the airplane control and instrument panel to cause the respective landing wheel assemblies 54 on the forward and rearward gear wheel assemblies 48, 50 to be pulled upwardly into a retracted position within the wheel receiver areas 35 in the main body assembly 22 to be covered by the wheel enclosure panels 55 in a conventional manner.

On reaching a flight destination, it is obvious that the flight control personnel would activate the landing gear/wheel assembly 15 to position the respective landing wheel assemblies 54 in the extended position as noted in FIG. 6 in preparation for landing on a runway at a destination airport terminal during a flight descent in a conventional manner.

On landing on the runway at the airport terminal, it is obvious that the flight control personnel would activate various controls in the airplane control and instrument panel to cause pivotal movement about respective vertical axes of the landing wheel assembly 54 of the forward gear wheel assembly 48 so as to cause turning movement of the body lift airplane assembly 12 on the runway to direct the same to the desired terminal at the airport terminal. The engine propulsion power assembly 18 would de-energize on stopping at the terminal gate area.

The flight attendant personnel would then activate the escalator cover assembly 42 to an opened position and then open the entrance door member 44. A flight attendant would then energize the moving step assembly 40 so that the passenger members and airline personnel can disembark and move through a gate into the airline terminal which completes the overall flight operation and method of this invention.

The body lift airplane assembly provides a main air lift body assembly being of a substantial width and length with the width equal to the length of the fixed wing members. This provides new and novel air flow characteristics above and below the main air lift body assembly to provide 1) superior air lift characteristics normally not found in an airplane body which normally relies on air lift from a fixed wing assembly; and 2) provides new and novel air flow into the engine propulsion power assembly to achieve superior power efficiency and fuel saving characteristics.

The body lift airplane assembly provides a new and novel main air lift body assembly and control features which is economical to manufacture; operable to support a plurality of passenger members in a comfortable domed passenger compartment section; easy to fly and control by flight control personnel; efficient in fuel and flight operations resulting in increased speed and efficiency with fuel savings; and substantially maintenance free.

While the invention has been described in conjunction with preferred specific embodiments thereof, it will be understood that this description is intended to illustrate and not to limit the scope of the invention, which is defined by the following claims:

I claim:

1. A body lift airplane assembly, comprising:
   a) a main air lift body assembly being of a disc shape including a pilot control section and a passenger compartment section;
   b) a fixed wing assembly secured to said main air lift body assembly and having a fixed wing member with a longitudinal axis extended transversely of a body longitudinal axis of said main air lift body assembly;
   c) said fixed wing member having a length substantially equal to a width of said main air lift body assembly; and
   d) an engine propulsion power assembly having a pair of spaced jet engine pod assemblies mounted within cut-outs in said main air lift body assembly and operable to receive air flow inlet both from above and below spaced surfaces of said main air lift body assembly to use aerodynamic airfoil forces and air flow over a curved surface to achieve efficiency and fuel saving operation of said engine propulsion power assembly,
   whereby said main air lift body assembly operates as an airfoil lift element in conjunction with said fixed wing member to increase flight and fuel efficiency.

2. A body lift airplane assembly comprising:
   a) a main air lift body assembly being of a disc shape including a pilot control section and a passenger compartment section;
   b) a fixed wing assembly secured to said main air lift body assembly and having a fixed wing member with a longitudinal axis extended transversely of a body longitudinal axis of said main air lift body assembly;
   c) said fixed wing member having a length substantially equal to a width of said main air lift body assembly;
   d) a landing gear/wheel assembly having gear wheel assemblies secured both forwardly and rearwardly on said main air lift body assembly, thus providing four sets of wheel members for take-off and landing of said body lift airplane assembly; and
   e) said gear wheel assemblies being retractably mounted and movable within lower confines of said main air lift body assembly when in the retracted positions.

3. A body lift airplane assembly comprising:
   a) a main air lift body assembly being of a disc shape including a pilot control section and a passenger compartment section;
   b) a fixed wing assembly secured to said main air lift body assembly and having a fixed wing member with a longitudinal axis extended transversely of a body longitudinal axis of said main air lift body assembly;
   c) said fixed wing member having a length substantially equal to a width of said main air lift body assembly; and
   d) a fin and rudder assembly connected to an upper rear portion of said main air lift body assembly including cooperating inclined fin members having pivotal rudder members thereon operable to provide for an efficient turning operation of said body lift airplane assembly.

4. A body lift airplane assembly, comprising:
   a) a main air lift body assembly being of a disc shape including a pilot control section and a passenger compartment section;
   b) a fixed wing assembly secured to said main air lift body assembly and having a fixed wing member with a longitudinal axis extended transversely of a body longitudinal axis of said main air lift body assembly; and
   c) said passenger compartment section operable to comfortably receive and support a plurality of passenger members therein and being enclosed by a domed cover member constructed of a transparent light sensitive material to turn dark during daylight sunlight conditions and turn to a lighter condition under decreasing dark conditions.

5. A body lift airplane assembly, comprising:
   a) a main air lift body assembly including a main body section having a compartment section to receive passenger members and flight control personnel; and
   b) a landing gear/wheel assembly pivotally connected to and extended from an undersurface of said main air lift body assembly and selectively movable from an extended landing position to a retracted air flight position.

6. A body lift airplane assembly, comprising:
   a) a main air lift body assembly including a main body section having a compartment section to receive passenger members and flight control personnel; and
   b) said main air lift body assembly having a pair of spaced engine cut-out portions having mounted therein respective ones of a jet engine pod assembly.

7. A body lift airplane assembly as described in claim 6, wherein:
   a) each of said jet engine pod assemblies having an engine housing with an air inlet section and an exhaust gas discharge section; and
   b) said inlet air section includes portions positioned above and below upper and lower surfaces of said main body section so as to efficiently and effectively direct inlet air through said inlet air section to provide for greater flight and fuel efficiency achieved from said jet engine pod assemblies.

8. A body lift airplane assembly, comprising:
   a) a main air lift body assembly including a main body section having a compartment section to receive passenger members and flight control personnel; and
   b) said main air lift body assembly having about a outer periphery integral with downwardly arcuate air lift portions to achieve air foil features and provide substantial air lift characteristics to said main air lift body assembly as normally found and achieved through an airplane's wing assembly; and
   c) said arcuate air lift portions extended along outer parallel side walls and a curved rear wall of said main air lift body assembly to achieve air foil lift characteristics.

* * * * *